United States Patent [19]
Nohara

[11] Patent Number: 5,572,259
[45] Date of Patent: Nov. 5, 1996

[54] METHOD OF CHANGING PERSONAL COMPUTER MONITOR OUTPUT FOR USE BY A GENERAL PURPOSE VIDEO DISPLAY

[75] Inventor: Ichiro Nohara, Miyoshi-gun, Japan

[73] Assignee: Maki Enterprise Inc., Tokushima, Japan

[21] Appl. No.: 329,826

[22] Filed: Oct. 27, 1994

[30] Foreign Application Priority Data

Oct. 29, 1993 [JP] Japan .................... 5-294017

[51] Int. Cl.⁶ ................ H04N 7/01; H04N 5/04
[52] U.S. Cl. ............ 348/441; 348/511; 348/739; 345/121
[58] Field of Search ..................... 358/445, 441, 358/449, 459, 553, 554, 556, 558, 561, 581, 555; 345/121, 154; 348/511, 510, 552, 739; H04N 5/04, 5/44, 9/44, 7/01, 11/02

[56] References Cited

U.S. PATENT DOCUMENTS

| | | | |
|---|---|---|---|
| 3,793,483 | 2/1974 | Bushnell | 348/511 |
| 4,227,215 | 10/1980 | Gurley et al. | 348/511 |
| 4,425,581 | 1/1984 | Schweppe et al. | 348/510 |
| 4,891,702 | 1/1990 | Nakayama et al. | 348/581 |
| 5,124,804 | 6/1992 | Socarras | 348/554 |
| 5,193,006 | 3/1993 | Yamazaki | 348/556 |

*Primary Examiner*—Micheal H. Lee
*Attorney, Agent, or Firm*—Wenderoth, Lind & Ponack

[57] ABSTRACT

Two techniques are used to display personal computer video on a general purpose video display such as a television set instead of on a monitor. First, the image area is defined to be smaller at the operating system level allowing the graphical user interface to appropriately process images. Second, the output video signal is delayed with respect to horizontal and vertical trigger pulses to properly align the image on the screen. This results in an easy to interpret image even on a low resolution television set and software compatibility on any general purpose video display.

6 Claims, 5 Drawing Sheets

METHOD OF CHANGING PERSONAL COMPUTER MONITOR OUTPUT FOR USE BY A GENERAL PURPOSE VIDEO DISPLAY

BACKGROUND OF THE INVENTION

This invention relates to a method of connecting a general purpose display (for example, a television set) to a personal computer (PC) in place of a high resolution monitor.

The PC is provided with a graphical user interface (GUI) for displaying its output on a monitor. The Apple Macintosh (Registered Trademark) Operating System and Microsoft Windows (Registered Trademark) are examples of GUI's. In general, PC's that use these types of GUI's output a red-green-blue (RGB) signal to the monitor for displaying images. When a general purpose video display such as the household television set is connected to a PC in place of a monitor, the RGB signal is converted to a National Television Systems Committee (NTSC) signal by a signal conversion circuit. A signal conversion circuit can display a monitor image on a general purpose video display such as a television set or a projection TV.

However, the entire PC screen image cannot be displayed on the general purpose video display by this method. As shown in FIG. 1, when the amount of information displayed by a monitor 13 is compared with that displayed by a general purpose video display 14, the amount displayed by the monitor is clearly greater. For that reason, the entire monitor screen cannot be displayed on a general purpose video display, i.e. a region 15 is not displayed. When the monitor screen 13 is displayed on a general purpose video display 14, the upper and lower edges and the left and right edges extend beyond the bounds of the general purpose video display screen 14 resulting in an over-scan condition.

Incidentally, the resolution of a typical monitor used with a PC is, for example, 640 pixels (horizontally) by 480 pixels (vertically). On the other hand, a typical household television set has a resolution on the order of 570 pixels (horizontally) by 430 pixels (vertically). Therefore, methods which simply convert the RGB signal to NTSC have the drawback that about 10% of the image information cannot be displayed.

To make up for this drawback, methods are used to compress monitor image information for presentation on a general purpose video display. These methods compress all the monitor image information and display it on a general purpose video display. This is accomplished principally by the following two well known methods.

① A filter is used to delete information at a fixed ratio from the monitor image signal. This method can compress monitor information in a simple manner. However, the monitor image cannot be accurately represented on the general purpose video display. For example, this method has the drawback that fine lines and points disappear entirely.

② Electron beam scanning of the phosphor screen of the cathode ray tube (CRT) is controlled. Although this method allows enlargement and reduction off the entire image represented on the video display, it can only be realized with a special purpose display. Realization of this method with a general purpose television set is completely out of the question.

The present invention was developed to overcome these and other drawbacks. It is thus an important object of the present invention to provide a method of changing monitor output for use by a general purpose video display such that monitor information can be accurately displayed on a general purpose video display such as a household television instead of on a monitor.

SUMMARY OF THE INVENTION

To achieve the previously stated object, the method of changing a monitor output for use by a general purpose video display of this invention is as follows. The present invention utilizes two techniques to display monitor images on a general purpose video display. First, the X and Y values of the image area that can be used For the display screen are reduced at the operating system (OS) level. Defining the image area in the operating system simplifies subsequent processing. For example, a 640 by 480 pixel image area defined for monitor use is redefined to a smaller 570 by 430 pixel area when connecting to a general purpose video display. In other words, the usable image area is defined smaller and any area larger than that defined cannot be used.

Even for the monitor, display area is not unlimited. Usable display area is restricted to 640 by 480 pixels for example. The graphical user interface (GUI) processes image information in a manner that allows display within this limited area. The method of the present invention is characterized by defining a smaller usable image display area at the OS level when connected to a general purpose video display than for a monitor. This is not a method that deletes information from the monitor image to display it on a general purpose video display as done in prior art methods. Instead, the usable image display area is established at the OS level.

Further, the method of the present invention is characterized by delaying the signal output to the video display by a prescribed time interval with respect to the scanning signal's horizontal and vertical synchronization trigger pulses. The purpose of this is to display information included in the reduced image area on the general purpose video display without misalignment on the screen.

The method of changing the monitor output for use by a general purpose video display of this invention defines a smaller image display area at the OS level. Since the usable image display area is reduced, the entire screen displayed by a high resolution monitor cannot be displayed. For example, a 640 by 480 pixel monitor image display area is reduced to 570 by 430 pixels when a general purpose video display is connected. This is similar to opening a smaller window of the GUI on the screen of a monitor. The smaller window cannot have the same image display as the entire monitor screen. This is because the image display area is reduced from what can be displayed by the monitor at the OS level.

For example, in the case of the Apple Macintosh (Registered Trademark), the monitor image display area setting is stored in the video circuit ROM. When the computer is turned on, the image display area information is read from read only memory (ROM). The method of the present invention resets the computer's usable display area to a smaller area immediately after the image display area information is read from the video circuit ROM.

The method of changing the PC monitor output for use by a general purpose video display of this invention has the characteristic that even when using a household television set of insufficient resolution in place of a monitor, monitor image information can be accurately displayed on the television set. In particular, the method of the present invention adjusts the display area size to match the resolution of the general purpose video display. Therefore, when a low resolution general purpose video display is used, the amount of information that can be displayed is reduced, but the information is clearly displayed without making the image difficult to interpret. Since the method of the present invention restricts image display size at the OS level, when a PC provided with a GUI is used, not only is it possible to use arbitrary screen sizes, but essentially all application software can be used in the normal fashion. Finally, since image position is adjusted by delaying the video signal with respect to the trigger pulses, this method has the characteristic that a suitable size image can be accurately positioned and displayed on a general purpose video display.

DETAILED DESCRIPTION OF THE INVENTION

The following describes an embodiment of the present invention based on the drawings. However, the following embodiment is only for the purpose of giving a concrete example of the technology of the method of this invention, and the method of changing a monitor output for use by a general purpose video display of this invention is in no way restricted to the following method.

The method of changing the personal computer (PC) monitor output for use by a general purpose video display of this invention includes a first step of setting a reduced image display area and a second step of accurately aligning the image on the general purpose video display.

In the first step, when the operating system (OS) is booted, the image display area of a general purpose video display is set to be smaller than that for a monitor. For the case where the general purpose video display is a household television set, the display area is set to 570 pixels (horizontal) by 430 pixels (vertical). In other cases, the display area is set to an optimum value depending on the general purpose video display.

Figure 1:
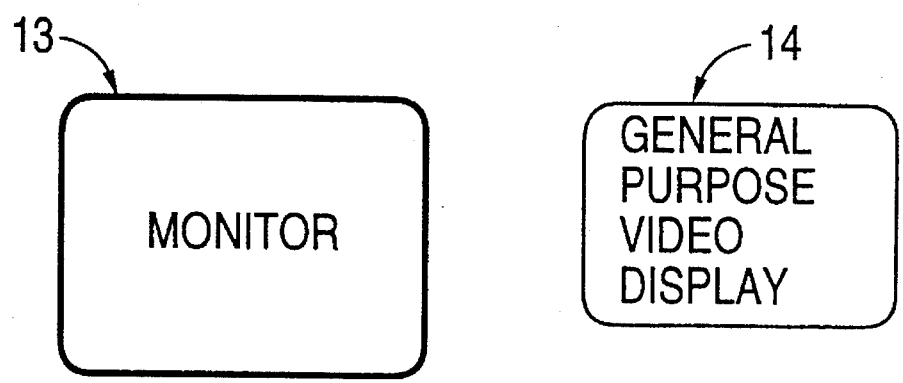
FIG. 1 is a front view comparing screen images that can be displayed by a monitor and by a household television set.
Figure 1:
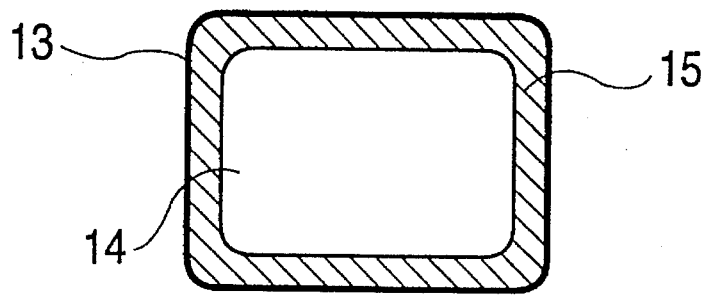
Figure 2:
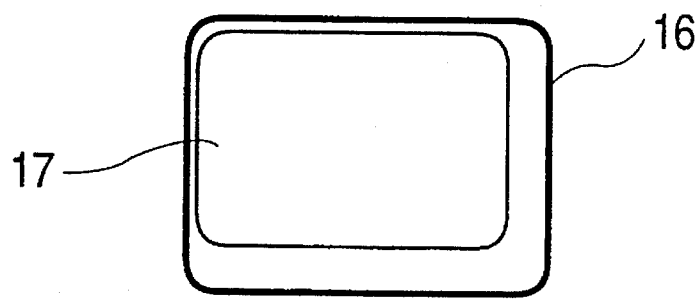
FIG. 2 is a front view comparing screen images that can be displayed by a monitor and by a household television set.

FIG. 2 illustrates establishment of the image display area. In this figure, the heavy outline shows the display area 16 for a monitor while the narrow outline shows the display area 17 for a general purpose video display. As shown in this figure, the display area 17 for a general purpose video display is set to be smaller than that for a monitor 16. When a PC operating system with a graphical user interface (GUI) is booted, or immediately after it is booted, the usable area of video random access memory RAM is set corresponding to the allowable display area of the monitor or general purpose video display connected.

When a monitor is connected to the PC, the usable video RAM is set, for example, to 640 pixels (horizontal) by 480 pixels (vertical). When the general purpose video display is a household television set and it is connected to the PC, the usable video RAM is set to 570 pixels (horizontal) by 430 pixels (vertical). Monitor image display area information is typically stored in the video circuit read only memory (ROM). When the OS is booted, the size of the video RAM area is initialized to the display area stored in the video circuit ROM. The image display area information for a general purpose video display is stored, for example, on hard or floppy disk media. When a household television set is connected in place of a monitor, a video driver interrupt is executed when the OS is booted, and the general purpose video display area information stored, for example, on hard disk, is used to set the video RAM area.

When the usable video RAM area is set in the first step, the visible screen area and the screen area usable by application programs is restricted at the OS level. As mentioned, the image display area of a monitor (typically 640×480) and of a general purpose video display (typically 570×430) are shown in FIG. 2.

As shown in FIG. 2, a general purpose video display 17 has a smaller image display area than that of a monitor, and the same monitor image cannot be displayed on a general purpose video display. Since the method of this invention limits the usable video RAM area to the general purpose video display area 15 at the OS level when a general purpose video display is connected to the PC instead of a monitor, an area outside the general purpose video display area 17 is not used. If video output intended for use on a general purpose video display is displayed on a monitor, one part of the monitor screen appears with no image. In other words, when a general purpose video display is connected, the output image size is changed limiting the usable screen area. Therefore, there is no effect on application software, and an extremely high degree of compatibility is possible.

Figure 3:
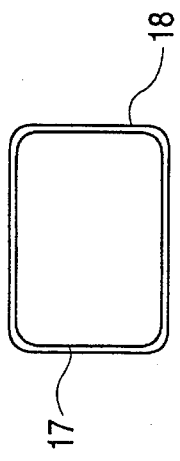
FIG. 3 is a front view showing display position for a monitor and a household television set.

In the second step of the method of this invention, the position of the image is adjusted for the monitor and general purpose video display. When usable video RAM area is set to a smaller general purpose video display area and video output is displayed on a monitor, the image is biased to the upper left of the screen as shown in FIG. 2. This is because the upper left of the monitor screen is treated as the origin. When usable video RAM area is set to monitor display area and video output is displayed on a general purpose video display, only the central part of the image is displayed as shown in FIG. 3. When usable video RAM area is set for a general purpose video display 18 and video output is displayed on a general purpose video display, the image 17 is displaced to the upper left as shown in FIG. 4, and time entire image is not visible.

Figure 5:
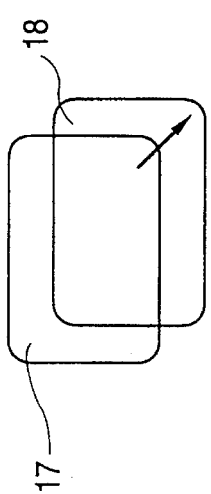
FIG. 5 is a front view showing position adjustment of the reduced image area for display on a household television set.
Figure 4:
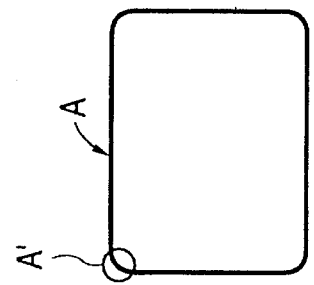
FIG. 4 is a front view showing screen position displacement due to display of reduced image area on a household television set.

The method of this invention corrects the position of the origin shown in FIG. 4 to change the image position by delaying the video signal output to the general purpose video display with respect to the scanning signal trigger by a prescribed time interval. This is the second step of the method of this invention. When image position is corrected, the entire image 17 can be displayed on the general purpose video display screen 18 as shown in FIG. 5.

In general, an OS with a GUI is able to use a plurality of monitors simultaneously. Position relations between various monitors are managed by the OS as coordinate data. Suppose that a plurality of monitors are connected for display. If the display position of a specified monitor is changed, then the origin will be displaced.

usable video RAM area when the Macintosh OS is booted. This software changes OS graphic port size and is written, for example, in Pascal style code as follows.

```
program ChangeScreenSize;
    var
        CurrentPort: = GDHandle;
        New_Vertical_Value:Integer;
        New_Horizontal_Value:Integer;
begin
    CurrentPort: = GetGDevice;
    CurrentPort+e,cir +ee +e,cir +ee .gdRect.bottom: = New_Vertical_Value;
    CurrentPort+e,cir +ee +e,cir +ee .gdRect.right: = New_Horizontal_Value;
    CurrentPort+e,cir +ee +e,cir +ee .gdPMap+e,cir +ee +e,cir +ee .Bounds.bottom: = New_
        Vertical_Value;
    CurrentPort+e,cir +ee +e,cir +ee .gdPMap+e,cir +ee +e,cir +ee .Bounds.right: = New_
        Horizontal_Value;
end.
```

Figure 6:
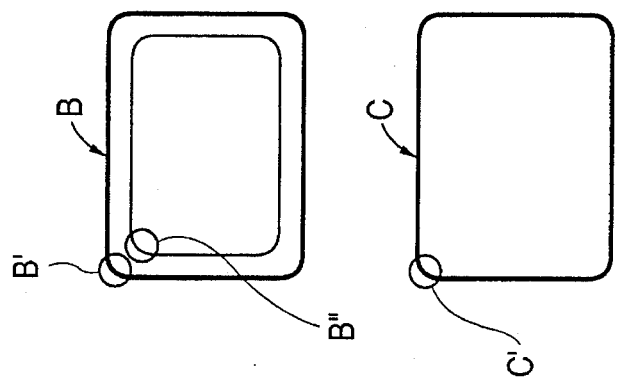
FIG. 6 is a front view showing display on three monitor screens.

FIG. 6 shows an example of three monitors used simultaneously. The OS treats one of the monitors upper left corner as the origin and manages the position relations between all the monitors as coordinate data. If the monitors A, B, and C are in the position relations shown in FIG. 6, and if coordinate position B' (V, H) is designated the overall origin:

① coordinate point A on monitor A' has the vertical and horizontal coordinates: V=origin V, H=origin H–width A; and ② coordinate point C' on monitor C has the vertical and horizontal coordinates: V=origin V–height B, H=origin H.

Now suppose that the usable display area of only monitor B is limited such that the actual origin is not included and moves to point B" towards the center of the display. The coordinates of the visible origin B" are now: V=origin V+y, H=origin H+x; and the relative position relations for monitor A and C coordinates are no longer in agreement.

The method of the present invention avoids this drawback by only changing the image area (at the OS level). The image position on the video display is suitably aligned by delaying the video signal with respect to the trigger pulse. The video signal delay time interval is optimally adjusted depending on the general purpose video display.

Consequently, the method of this invention used with a PC having a GUI allows the use of arbitrary sized image areas. Further, since there is no effect on other application software, a high degree of compatibility is achieved. Still further, when outputting to a general purpose video display through the signal conversion circuit, an image size suitable for the resolution of that general purpose video display can be output.

Figure 7:
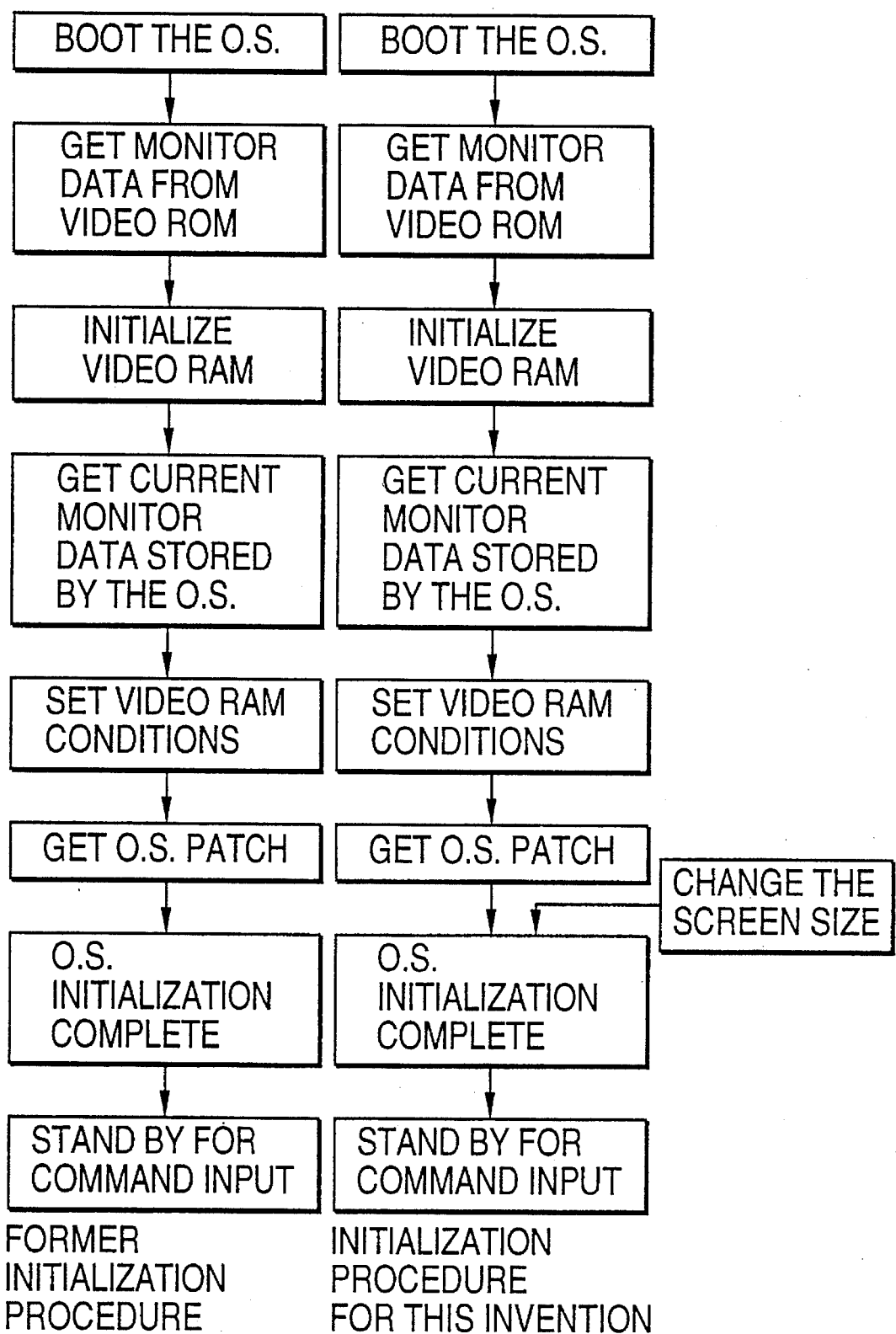
FIG. 7 depicts flow-charts showing a prior art method and the method of the present invention.

Turning to FIG. 7, a flowchart for changing PC output for general purpose video display use is shown along with a flowchart with no changes. The flow-chart on the right side of this figure shows the method of this invention and the left side shows a flow that does not change PC output for general purpose video display use. As shown, the method of this invention is provided with a step that changes the image size, for example, to 570 pixels (vertical) by 430 pixels (horizontal) prior to the completion of OS initialization. At this step image size is changed and then OS initialization is completed.

An embodiment of this invention using an Apple Macintosh (Registered Trademark) is discussed in the following. Software is prepared to forcibly change the image size of Software including the above routine with a suitable header is written in INIT installable format for automatic execution at OS boot-up. Consequently, it behaves as an OS patch program.

As shown in FIG. 2, changing the usable video RAM area is equivalent to changing the image area width and height. This does not change the position of the overall image. The video signal output to a general purpose video display, which has its image size set smaller than that for a monitor, is delayed with respect to the trigger signal to change the image position on the screen.

Figure 8:
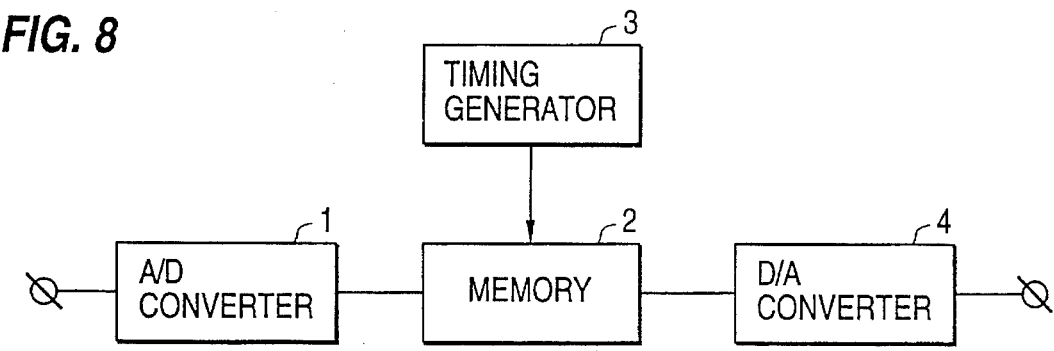
FIG. 8 is a circuit block diagram to delay the video signal with respect to the trigger signal by digital processing.
Figure 9:
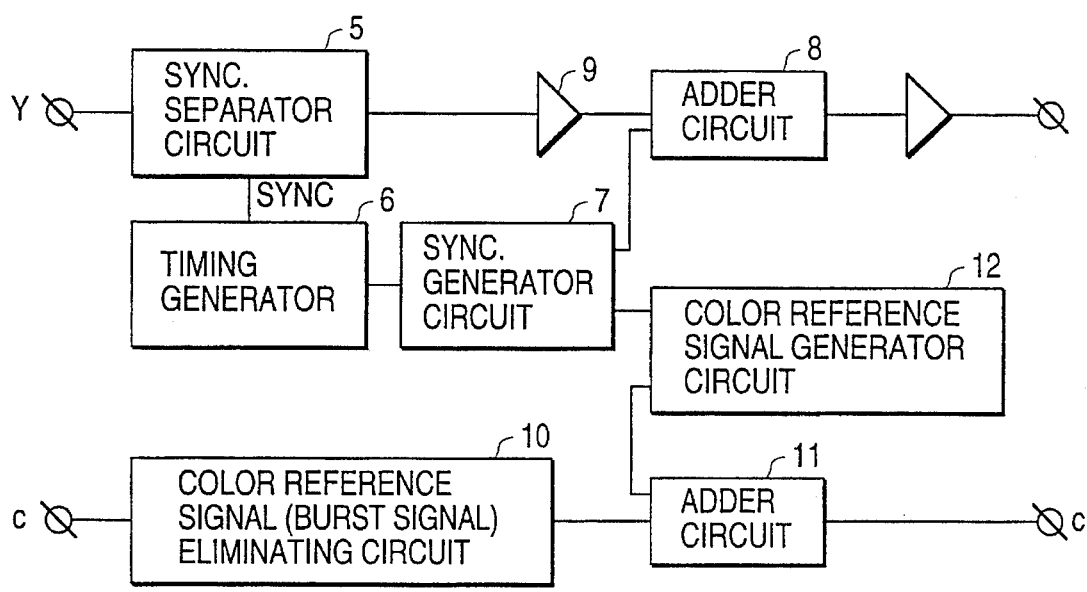
FIG. 9 is a circuit block diagram to delay the video signal with respect to the trigger signal by analog techniques.
Figure 10:
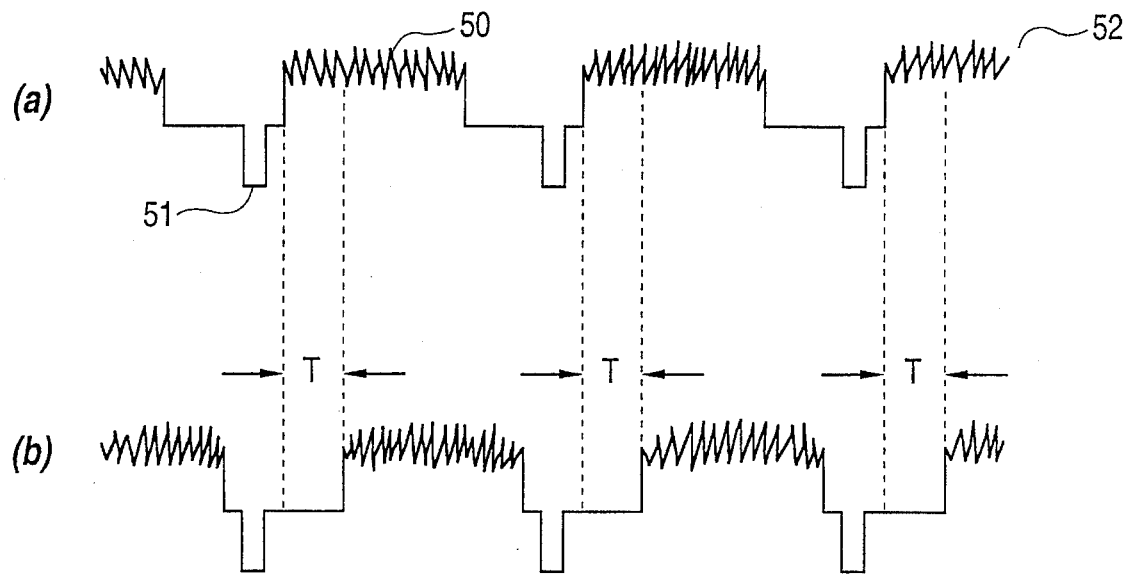
FIG. 10 is a graph showing a wave-form with the video signal delayed with respect to the trigger signal.

Turning to FIG. 8 and FIG. 9, circuits to change image position on a display screen are shown. As shown in FIG. 10, the circuit of FIG. 8 operates on the input signal 52 to delay the video signal 50 by a time (T) with respect to the synchronization trigger 51 included in the input signal 52. The video signal delay time (T) changes image position along the x axis by delay with respect to the horizontal synchronization trigger and changes image position along the y axis by delay with respect to the vertical synchronization trigger.

The circuit of FIG. 8 operates on the input signal as a digital signal while the circuit of FIG. 9 operates on the input signal as a analog signal. In both cases, the video signal is delayed with respect to the trigger to adjust image position for display on a general purpose video display.

The circuit of FIG. 8 converts the analog PC output signal to digital format with an A/D converter. The converted digital signal image Is expanded in memory 2 and the video signal is delayed a time (T) with respect to the trigger by use of a timing generator 8. Finally, the video signal delayed with respect to the trigger is converted back to analog format with a D/A converter and output to a general purpose video display.

Figure 11:
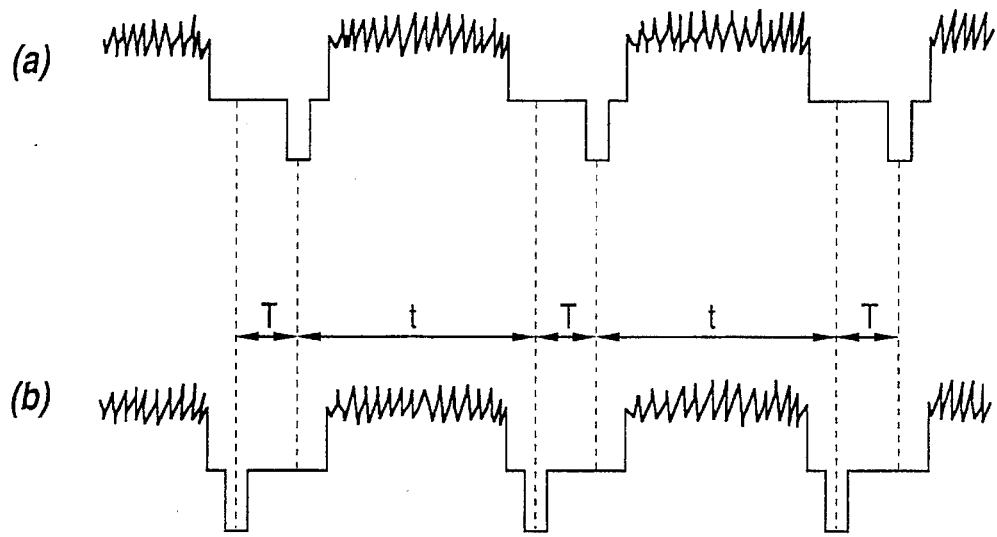
FIG. 11 is a graph showing a wave-form with the trigger signal delayed such that the video signal is actually delayed with respect to the trigger signal.

The circuit shown in FIG. 9 delays the video signal with respect to the trigger by operating on the NTSC color television Y or luminance signal. This circuit separates the synchronization signal from the Y signal using a sync. separator circuit 5. The separated synchronization signal serves as a trigger to generate oscillations from the timing generator 6. The output signal from the timing generator 6 in turn triggers the sync. generator circuit 7. The sync. generator circuit 7 outputs a trigger pulse which is delayed by a fixed time interval with respect to the input trigger pulse. In other words, the output trigger is delayed by a given time (t) with respect to the input trigger. As shown in FIG. 11, a trigger pulse delayed by time (t) by the sync. generator circuit 7 becomes the trigger pulse for the next video signal.

As shown in FIG. 11, this signal processing method can adjust the delay time of a video signal with respect to the trigger without changing the video signal time. This is because the trigger pulse can be advanced with respect to the video signal by using each trigger pulse as the trigger for the next video signal.

The time adjusted trigger pulse from the sync. generator circuit 7 is added to the luminance signal by the adder circuit 8 and then output. The video signal is input to the adder circuit 8 from the sync. separator circuit 5 via the buffer 9. By adjusting trigger pulse timing rather than delaying the video signal, the circuit of FIG. 9 can delay the video signal with respect to the trigger using an extremely simple circuit.

Further, the C signal is output after passing through the color reference signal eliminating circuit 10 and the adder circuit 11. The adder circuit 11 outputs the addition of the color reference signal eliminating circuit 10 output with the color reference signal generator circuit 12 output. The input to the color reference signal generator circuit 12 is the output signal from the sync. generator circuit 7. In this manner, color bleeding is reduced by the C signal processing circuit.

The preceding embodiment uses a household television set as the general purpose video display. The method of the present invention is not limited to the television set as the general purpose video display. For example, a projection television or other video apparatus may be used as the general purpose video display.

What is claimed is:

1. A method for causing a personal computer to generate a video display output for a general purpose video display device, the personal computer having an operating system and configured to normally generate a computer monitor display output at a timing set by scanning trigger pulse signals, the resolution of the computer monitor display output being stored in a video memory and being greater than that of the video display output, said method comprising:

changing the resolution set in the video memory to a modified resolution coinciding with the resolution of the video display output, wherein upon initialization of the operating system the modified resolution is read from the video memory to set a corresponding image area of a video signal;

delaying the video signal by a prescribed time interval with respect to the scanning signal trigger pulses to generate the video display output for the general purpose video display device;

wherein the video signal includes a Y signal containing a synchronization signal, and wherein said delaying step comprises (a) separating the synchronization signal from the Y signal, (b) using the synchronization signal to trigger oscillations from a timing generator, (c) using the oscillations from the timing generator to trigger a synchronization generator which outputs delayed trigger pulses which are delayed by the prescribed time interval with respect to the scanning signal trigger pulses, and (d) using the delayed trigger pulses to delay the video signal by the prescribed time interval.

2. A method as claimed in claim 1, wherein the resolution of the video display output is 570 by 430 pixels.

3. A method as claimed in claim 2, wherein the resolution of the computer monitor is 640 by 480 pixels.

4. A method as claimed in claim 1, wherein the video memory is a random access memory, and wherein said changing step further includes executing the initialization of the operating system to read the modified resolution from a read only memory and to then write the read modified resolution in the random access memory.

5. A method as claimed in claim 2, wherein the video memory is a random access memory, and wherein said changing step further includes executing the initialization of the operating system to read the modified resolution from a read only memory and to then write the read modified resolution in the random access memory.

6. A method as claimed in claim 3, wherein the video memory is a random access memory, and wherein said changing step further includes executing the initialization of the operating system to read the modified resolution from a read only memory and to then write the read modified resolution in the random access memory.

\* \* \* \* \*